(12) United States Patent
Sakazume (10) Patent No.: US 7,023,972 B1
(45) Date of Patent: Apr. 4, 2006

(54) COMMUNICATION SYSTEM AND COMMUNICATION METHOD SHARING COMMUNICATION DATA AMONG A PLURALITY OF COMMUNICATION TERMINALS

(75) Inventor: Yuka Sakazume, Kanagawa (JP)

(73) Assignee: Sony Corporation, Tokyo (JP)

( * ) Notice: Subject to any disclaimer, the term of this patent is extended or adjusted under 35 U.S.C. 154(b) by 887 days.

(21) Appl. No.: 09/655,226

(22) Filed: Sep. 5, 2000

(30) Foreign Application Priority Data

Sep. 29, 1999 (JP) .............................. P11-275715

(51) Int. Cl.
*H04M 1/64* (2006.01)
(52) U.S. Cl. .................................... 379/88.25; 455/463
(58) Field of Classification Search ................ 455/553, 455/557, 435, 517, 414, 412.1; 379/200, 379/88.12, 88.13, 88.14, 88.17, 88.26, 88.25, 379/211.01, 211.02, 88.23; 370/328
See application file for complete search history.

(56) References Cited

U.S. PATENT DOCUMENTS

| | | | | |
|---|---|---|---|---|
| 4,602,129 A * | 7/1986 | Matthews et al. | ....... | 379/88.26 |
| 5,550,907 A * | 8/1996 | Carlsen | ................. | 379/211.02 |
| 5,794,039 A * | 8/1998 | Guck | ..................... | 707/103 R |
| 6,201,858 B1 * | 3/2001 | Sundhar | ................... | 379/88.12 |
| 6,295,284 B1 * | 9/2001 | Maggenti | ..................... | 370/328 |
| 6,418,306 B1 * | 7/2002 | McConnell | ............... | 379/88.12 |
| 6,477,240 B1 * | 11/2002 | Lim et al. | ................ | 379/88.13 |
| 6,483,899 B1 * | 11/2002 | Agraharam et al. | ..... | 379/88.14 |
| 2001/0054069 A1 * | 12/2001 | Kawamura et al. | | |

* cited by examiner

*Primary Examiner*—Fan Tsang
*Assistant Examiner*—Gerald Gauthier
(74) *Attorney, Agent, or Firm*—Bell, Boyd & Lloyd LLC

(57) ABSTRACT

A common phone number which is used only among a specific group consisting of members registered in a network is ensured to enable transmitting/receiving a message file at an arbitrary point of time. A management terminal in a network sends identification names of prescribed communication terminals corresponding to an issued common phone number to a phone number management center so as to register the communication terminals in correspondence with common phone number. A message file sent from an arbitrary one of the communication terminals to the common phone number is sent to all the other registered communication terminals or left in a message center, and the arrival of the message file is notified to all the other registered communication terminals. A message sent from an arbitrary one of the communication terminals to the common phone number can also be left on a bulletin board, allowing other registered communication terminals to read the message file left in the message center or the message left on the bulletin board at any time.

12 Claims, 7 Drawing Sheets

COMMUNICATION SYSTEM AND COMMUNICATION METHOD SHARING COMMUNICATION DATA AMONG A PLURALITY OF COMMUNICATION TERMINALS

BACKGROUND OF THE INVENTION

1. Field of the Invention

The present invention relates to a communication system and a communication method, in particular, to a communication system and a communication method in which a phone number which is commonly used only among communication terminals of a specific group consisting of members registered in a network is secured and a message can be transmitted/received at an arbitrary point in time.

2. Description of Related Art

Conventionally, only one phone number has been assigned for a communication terminal (or a communication line). Therefore, in a case of communication with a plurality of people, one must know respective phone numbers of communication terminals of all the target destinations and carry out individual communication for each destination even if the communication contents are the same.

As a prior art technique related to this field, numerous patent applications in relation with a sound multiplex system for teleconference have been filed.

In addition, including Magic-Box of NTT (Nippon Telegraph and Telephone Corporation), techniques to execute a function of an answering machine are known to public.

Further, the Internet technology, which a provider relays is also known to public.

By the way, conventionally, it has been necessary to know phone numbers of the communication terminals of all of communication destinations for communicating with a plurality of people, which makes the management of the phone numbers of the communication destinations troublesome.

In addition, it brings a problem that the labor and time required for communication with individual persons become enormous.

Furthermore, in a case where a subscriber of a network possesses and manage a plurality of communication terminals, the subscriber owns a plurality of phone numbers, each number corresponding to each of the plurality of communication terminals, which causes management the phone numbers terrible.

According to the technique of the above-described sound multiplex system for teleconference, all the members should participate in the communication at the same time, and it is not possible for a member to transmit a message to another member and to receive a message from another member to him/her at an arbitrary point time.

In addition, according to the Magic-Box of NTT (Nippon Telegraph and Telephone Corporation), a function of an answering machine of a local line is merely provided externally and the problem of complexity on management due to one-to-one correspondence between a communication terminal (telephone) and a phone number is not solved.

Furthermore, according to the Internet technology, it is necessary to set up a personal computer and to contract with an Internet service provider in addition to have a communication terminal (telephone). Even in a bulletin board function, confidentiality only among the members cannot be always guaranteed.

SUMMARY OF THE INVENTION

The present invention has been made in view of the above described problems in the conventional communication system, and an object of the present invention is to provide a communication system which is capable of securing a phone number which is common only among communication terminals of specified members, which have been registered in a network, and transmitting/receiving a message at an arbitrary point of time.

Another object of the present invention is to provide a communication method which is capable of securing a phone number which is common only among communication terminals of specified members, which have been registered in a network, and transmitting/receiving a message at an arbitrary point of time.

According to the present invention, in order to solve the above-mentioned problem, there is provided a communication system in which a plurality of communication terminals, which are connected to a network including a Public Switched Network in a category thereof, mutually communicate through communication data addressed to a common phone number issued by a communication terminal being a management terminal, which comprises a phone number management unit, a message management unit and a bulletin board unit provided in said network; means for registering a predetermined communication terminal so as to correspond to the issued common phone number by sending an identification name of the predetermined communication terminals of the plurality of communication terminals to the phone number management unit in correspondence with the common phone number issued from the management terminal; means for sending a message file sent by accessing from a registered communication terminal to the common phone number to other registered communication terminals when a first mode in which the message file is to be directly sent to the other communication terminals is selected, and leaving the message file in the message management unit when a second mode in which any registered communication terminal accesses to the message management unfit to receive the message file is selected; means for leaving a message sent by accessing from a registered communication terminal to the common phone number on the bulletin board unit; and means for reading at any time the message file left in the message management unit, in a case where the message file is left in the message management unit, and the message left on the bulletin board unit, in a case where the message is left on the bulletin board unit, from an arbitrary one of the other registered communication terminals.

Furthermore, there is provided a communication system in which a plurality of communication terminals, which are connected to a network including a Public Switched Network in a category thereof, mutually communicate through communication data addressed to a common phone number issued by a communication terminal being a management terminal, which comprises a phone number management unit, a message management unit and a bulletin board unit provided in said network; means for registering, after being accessed by an arbitrary one of the plurality of communication terminals using the issued common phone number and receiving a confirmation by the management terminal, the arbitrary one of the communication terminals in correspondence with the common phone number issued from the management terminal; means for sending a message file sent by accessing from a registered communication terminal to the common phone number to other registered communication terminals when a first mode in which the message file is to be directly sent to the other communication terminals is selected, and leaving the message file in the message management unit when a second mode in which any registered communication terminal accesses to the message management unit to receive the message file is selected; means for leaving a message sent by accessing from a registered communication terminals to the common phone number on the bulletin board unit; and means for reading at any time the message file left in the message management unit, in a case where the message file is left in the message management unit, and the message left on the bulletin board, in a case where the message is left on the bulletin board unit, from an arbitrary one of the other registered communication terminals.

Furthermore, there is provided a communication method in which a plurality of communication terminals, which are connected to a network including a Public Switched Network in a category thereof, mutually communicate through communication data addressed to a common phone number issued by a communication terminal being a management terminal, in which the network is provided with a phone number management unit, a message management unit and a bulletin board unit, and the method comprises the steps of: registering a predetermined communication terminal so as to correspond to the issued common phone number by sending an identification name of the predetermined communication terminal of the plurality of communication terminals to the phone number management unit in correspondence with the common phone number issued from the management terminal; sending a message file sent by accessing from a registered communication terminal to the common phone number to other registered communication terminals when a first mode in which the message file is to be directly sent to the other communication terminals is selected, and leaving the message file in the message management unit when a second mode in which any registered communication terminal accesses to the message management unit to receive the message file is selected; leaving a message sent by accessing from a registered communication terminals to the common phone number on the bulletin board unit; and reading at any time the message file left in the message management unit or the message left on the bulletin board unit from an arbitrary one of the registered communication terminal.

Furthermore, there is provided a communication method in which a plurality of communication terminals, which are connected to a network including a Public Switched Network in a category thereof, mutually communicate through communication data addressed to a common phone number issued by a communication terminal being a management terminal, in which the network is provided with a phone number management unit, a message management unit and a bulletin board unit, and the method comprises the steps of: registering, after being accessed by an arbitrary one of the plurality of communication terminals using the issued common phone number and receiving a confirmation by the management terminal, the arbitrary one of the other communication terminals in correspondence with the common phone number issued from the management terminal; sending a message file sent by accessing from a registered communication terminal to the common phone number to other registered communication terminals when a first mode in which the message file is to be directly sent to the other communication terminals is selected, and leaving the message file in the message management unit when a second mode in which any registered communication terminal accesses to the message management unit to receive the message file is selected; leaving a message sent by accessing from a registered communication terminals to the common phone number on the bulletin board unit; and reading at any time the message file left in the message management unit, in a case where the message file is left in the message management unit, and the message left on the bulletin board unit, in a case where the message is left on the bulletin board unit, from an arbitrary one of the other registered communication terminals.

That is, the present invention provides means for mutually transmitting communication data between members networked with a common phone number issued by a management terminal in a network including a Public Switched Network in a category thereof. Therefore, in the network, a phone number management center which manages members registered in correspondence with the common phone number issued from the management terminal is provided as well as a message center and a bulletin board which are accessed through the common phone number and can store the communication data therein.

There are two modes for registering members, one in which a prescribed member is designated upon issuing the common phone number from the management terminal, and the other in which one of unspecified number of users inside the network is added as a member with agreement at the management terminal when the user accesses the common phone number.

The user who accesses the common phone number is determined whether or not he/she is a registered member by the phone number management center. Communication data stored in the message center or the bulletin board can be taken out using any registered communication at times.

In a case where the communication data is a message file, different from a case of a message, the message file itself or a notice informing that the message file arrives at the message center is delivered to all of the registered communication terminal.

In a case where the communication data is a message, the message is left on the bulletin board and the members access the bulletin board to read the message.

Here, both the "message file" and the "message" consist of any of voice data, image data and text data or a combination thereof. The "message file" can be directly transmitted. In a case where a "message file" left in the message center consists of voice data, one can hear the "message file" and in another case of the "message file" consisting of image data and text data, one can download the "message file". However, in any case, the "message file" cannot be seen or read through a display screen. On the other hand, the "message" left on the bulletin board can be seen, read and heard through a display screen in a condition that the "message" is on the bulletin board. In addition, it is also possible to download the "message" if one instructs through the display screen to download the "message"

BRIEF DESCRIPTION OF THE DRAWINGS

These and other objects and advantages of the present invention will become more apparent and more readily appreciated from the following detailed description of the presently preferred exemplary embodiments of the present invention taken in conjunction with the accompanying drawings of which.

DETAILED DESCRIPTION OF THE PREFERRED EMBODIMENTS

Now, preferred embodiments of the present invention will be described in reference to the accompanied drawings.

First Embodiment

Figure 1:
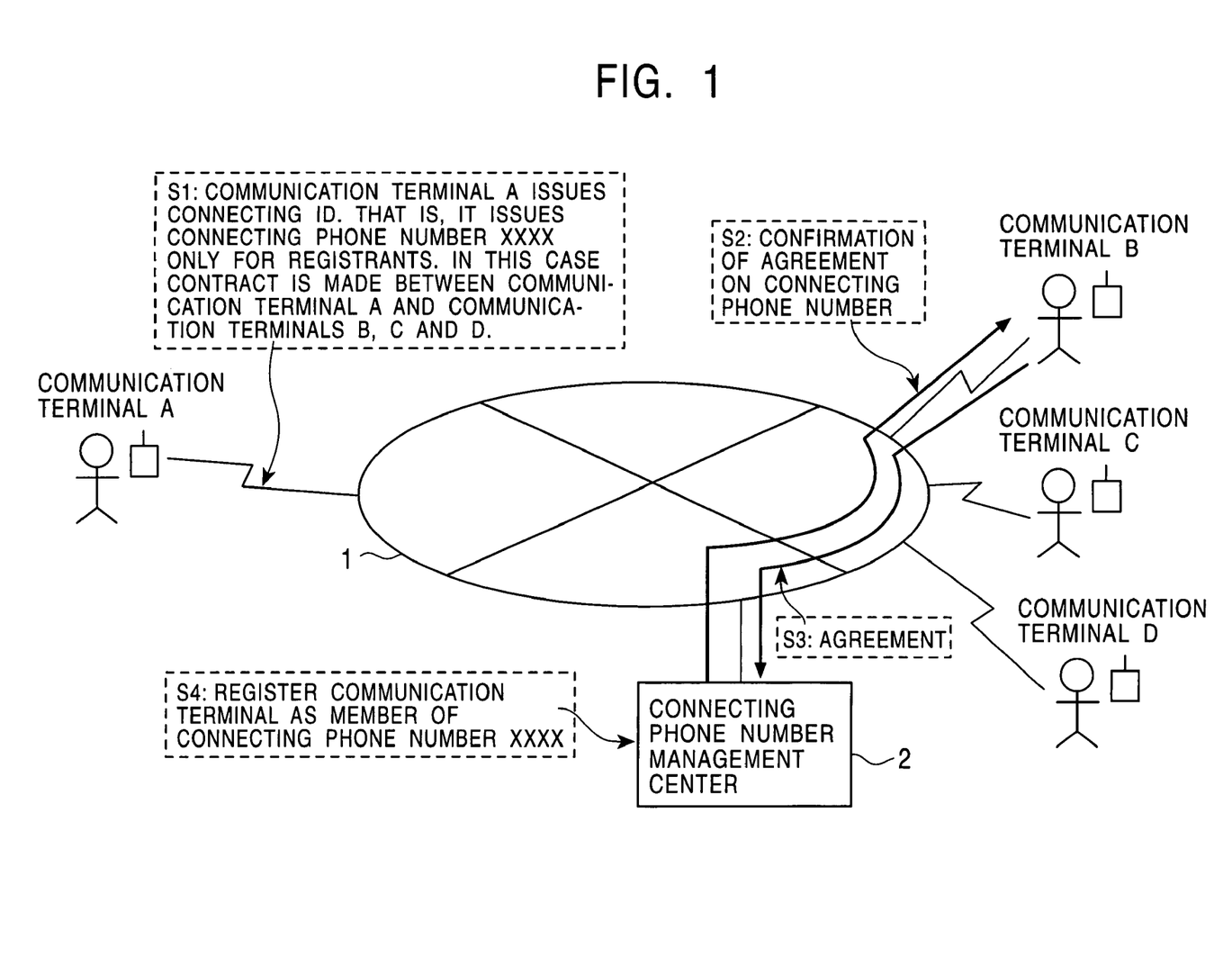
FIG. 1 is a block diagram showing a configuration of a communication system and a mechanism of registering members according to a first embodiment of the present invention.

FIG. 1 is a configuration of a communication system according to a first embodiment of the present invention and a mechanism of registering members thereof.

The communication system according to the present embodiment includes a network having a Public Switched Network in a category; a communication terminal A being a contractant of a community, which is connected to the network 1; communication terminals B, C, D which are to be registered as members; and a connecting phone number management center 2.

Each of the communication terminals connected to the network has an identification name. The identification name may be a telephone number, an E-mail address and some kind of identification number, assigned to each of the communication terminals. In a case where the communication terminal is capable of using a medium, the identification name may be some kind of identification number assigned to the medium.

Now, an operation of registering members in the communication system according to the present embodiment will be described.

At Step S1, the communication terminal A designates the other members (in this case, the communication terminals B, C, D) of a specific community to be constructed now, and issues a "connecting ID". The "connecting ID" is in specific, a "connecting phone number", which is common among registered members in a community. The communication terminal A transfers data with regard to the members of the specific community to be constructed and the issued "connecting ID" (that is, the "issued connecting phone number") to the connecting phone number management center 2.

Once the "connecting ID", that is, the connecting phone number, is issued, a confirmation on accepting the connecting phone number is sent to the designated communication terminals B, C, D from the connecting phone number management center 2, at Step S2.

At Step S3, if the designated communication terminal agrees to accept the connecting phone number, a user of the communication terminal in agreement becomes an official member of the specific community, and then, the connecting phone number management center 2 registers a phone number (or an ID) of the communication terminal in agreement in correspondence with the connecting phone number and officially delivers the connecting phone number to the communication terminal in agreement at Step S4.

The communication terminal A being a management terminal can generate a qualified community in line with a "connecting ID" delivery method with the above-described operation.

In addition, it is possible to set a charge rate at the time of issuing the connecting phone number in the mechanism of registering members shown in FIG. 1.

It is also possible to change the charge rate among the members at a later time.

Furthermore, it is possible to set a discounted course, which provides a discounted charge of the connecting phone number as shown in Table 1 below, in return to an advertising announcement at the time of use or posting an advertisement on a bulletin board described later.

TABLE 1

| CONNECT-ING ID | COMMUNI-CATION TERMINAL A | COMMUNI-CATION TERMINAL B | COMMUNI-CATION TERMINAL C | COMMUNI-CATION TERMINAL D |
|---|---|---|---|---|
| XXXX | 20% | 20% | 20% | 20% |
| XXXX | 100% | 0% | 0% | 0% |
| XXXX | 60% | 10% | 10% | 20% |

Figure 2:
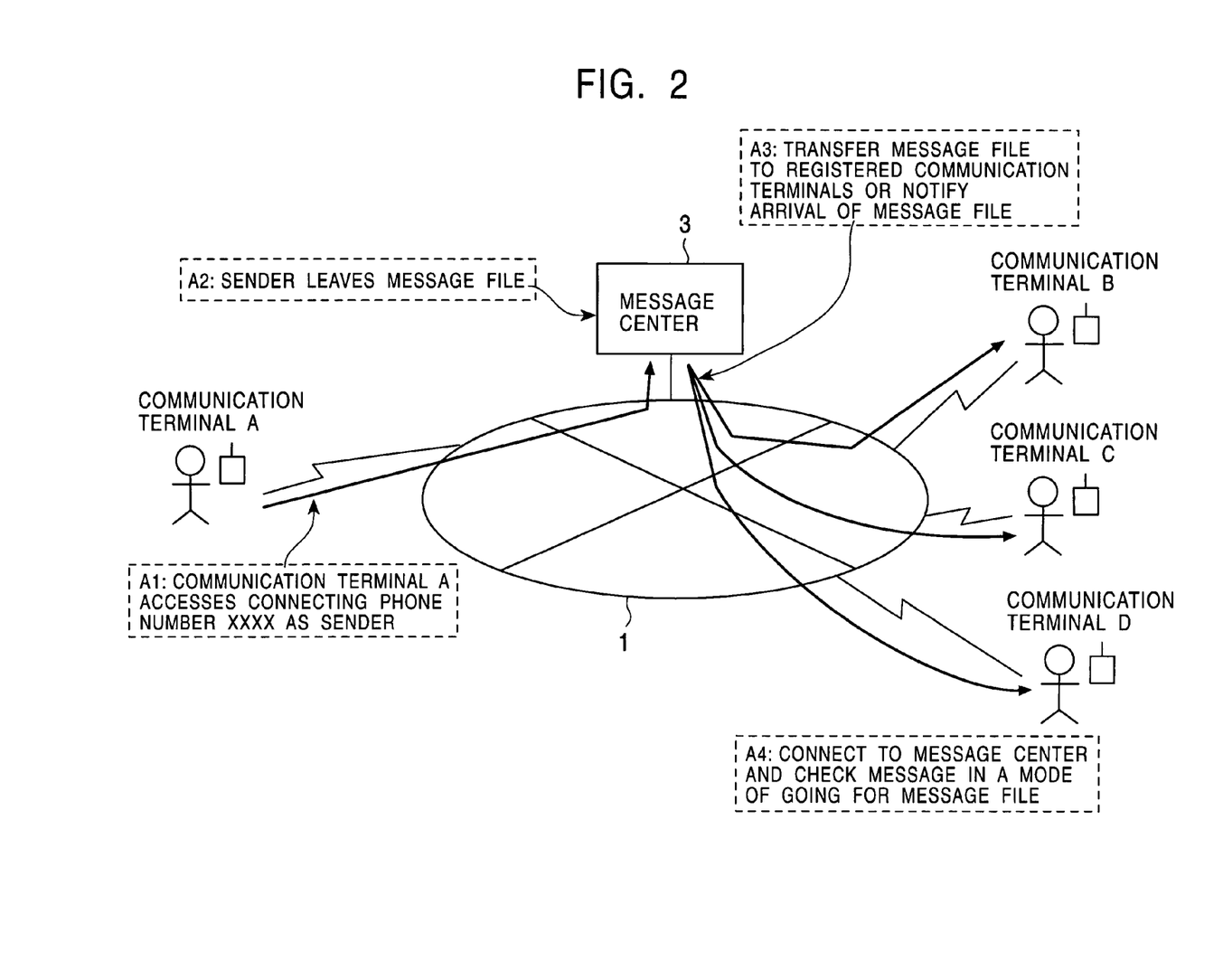
FIG. 2 is a block diagram showing a mechanism of message transfer in the communication system according to the first embodiment of the present invention.

FIG. 2 is a block diagram showing a mechanism of message transfer of the communication system according to a first embodiment of the present invention.

In FIG. 2, there is exemplified a case where a user of the communication terminal A being the management terminal sends a message file to all members of the specific community.

An operation of the message transfer of the communication system according to the present invention will now be described.

First, at Step A1, the communication terminal A being the management terminal tries, as a sender, to access to the delivered connecting phone number XXXX. A message center 3 attached to the network 1 confirms that the communication terminal A is a registered member of the connecting phone number XXXX to allow the communication terminal A to access to the connecting phone number. After the access is allowed, the user of the communication terminal A selects any one of a first mode in which a message file to be transferred is directly sent to the other members and a second mode in which a registered member accesses to the message center 3 to receive the message file to be transferred. Next, the communication terminal A sends a message file consisting of voice information, character information, image information and the like.

At Step A2, the message file sent to the message center 3 is stored in a memory in the message center 3.

At Step A3, in a case where the communication terminal A selects the first mode in which the message file to be transferred is directly sent to the other members, the message center 3 directly sends the message file to the communication terminals registered to the connecting phone number XXXX other than the communication terminal being the sender (in this case, the communication terminal A). On another case where the communication terminal A selects the second mode in which the other member accesses the message center 3, the message center 3 sends only a notice that the message file has arrived to the communication terminals registered to the connecting phone number XXXX other than the communication terminal being the sender (in this case, the communication terminal A).

At step A4, when a member registered to the connecting phone number XXXX receives the notice and accesses the message center at an arbitrary point of time, the registered member can read or hear the message file from the communication terminal A.

According to the message transfer method shown in FIG. 2, it is possible to send a message file from a specific sender to a plurality of members at a time. Furthermore, among the registered members, it is possible to communicate with a registered member using the above-described message transfer method, even if a sender does not know a phone number of the registered member.

In addition, it is possible to prevent leakage of individual phone numbers since only the connecting phone number remains in the memory of the communication terminals in the message center 3.

Figure 3:
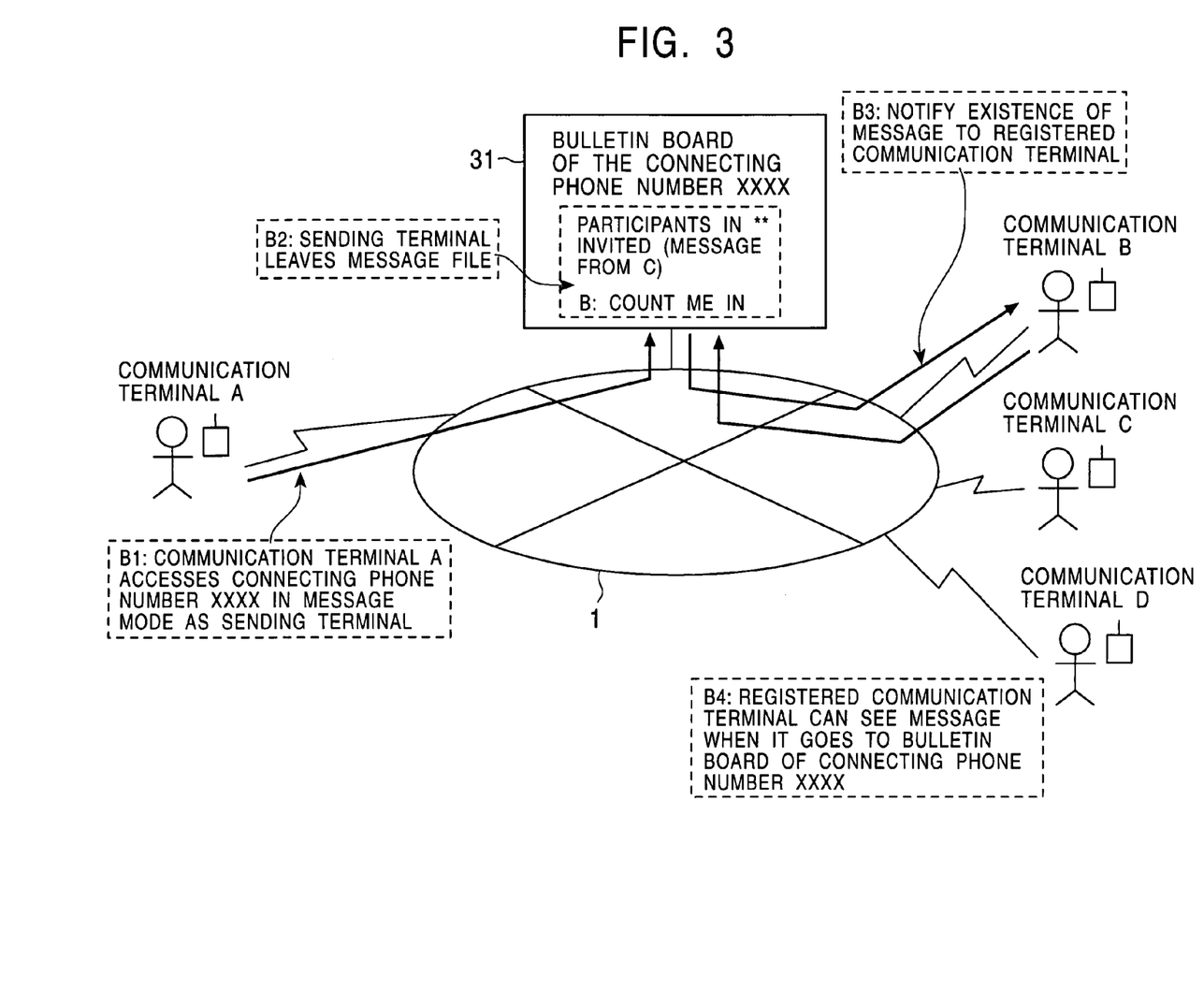
FIG. 3 is a block diagram showing a mechanism of a bulletin board function of the communication system according to the first embodiment of the present invention.

FIG. 3 is a block diagram showing a mechanism of a bulletin board function of the communication system according to the first embodiment of the present invention.

FIG. 3 shows a case where a message from the user of the communication terminal A being the management terminal to all members of the specific community is stored in a bulletin board 31 for the connecting phone number XXXX in the message center 3.

An operation for realizing the bulletin board function of the communication system of the present embodiment will now be described.

First, at Step B1, the communication terminal B which is registered to the connecting phone number XXXX accesses the connecting phone number in a message mode. A connecting phone number management center 2 attached to the network 1 allows the communication terminal B to access the connecting phone number XXXX since the communication terminal B is a registered communication terminal registered to the connecting phone number XXXX. Next, the communication terminal B leaves a message consisting of voice information, character information, image information and the like.

Accordingly, at Step B2, the message is stored on the bulletin board 31 for the connecting phone number XXXX, and at Step B3, the message center 3 notifies the communication terminal registered to the connecting phone number XXXX except for the sender (in this case, the communication terminal B) that a new message is now on the bulletin board 31 for the connecting phone number XXXX.

At Step B4, when a user of a communication terminal registered to the connecting phone number XXXX receives the notice and accesses to the bulletin board 31 of the connecting phone number, the user of the registered communication terminal can read or hear the new message from the communication terminal A.

As another method for accessing the bulletin board 31 of the connecting phone number XXXX, it is also possible to select a mode in which the message is taken out from the bulletin board 31 after the communication terminal connects to the connecting phone number XXXX.

According to the method illustrated in FIG. 3, all members can have a look at the logs among the members already registered to date at a time. Accordingly, there is no need to remember the other members' phone numbers and call one another among the registered members. In addition, since no one but the users of the registered communication terminals can access the connecting phone number XXXX, security for the message on the bulletin board is guaranteed.

Similar to the function shown in FIG. 2, every member can communicate with the other members independent from the phone number peculiar to each member.

Furthermore, a user who possesses a plurality of communication terminals can have an advantage to reduce bothersome management of the phone numbers of the plurality of communication terminals.

Exchange operation on the network 1 of the communication system according to the present embodiment will be described later.

Second Embodiment

Figure 4:
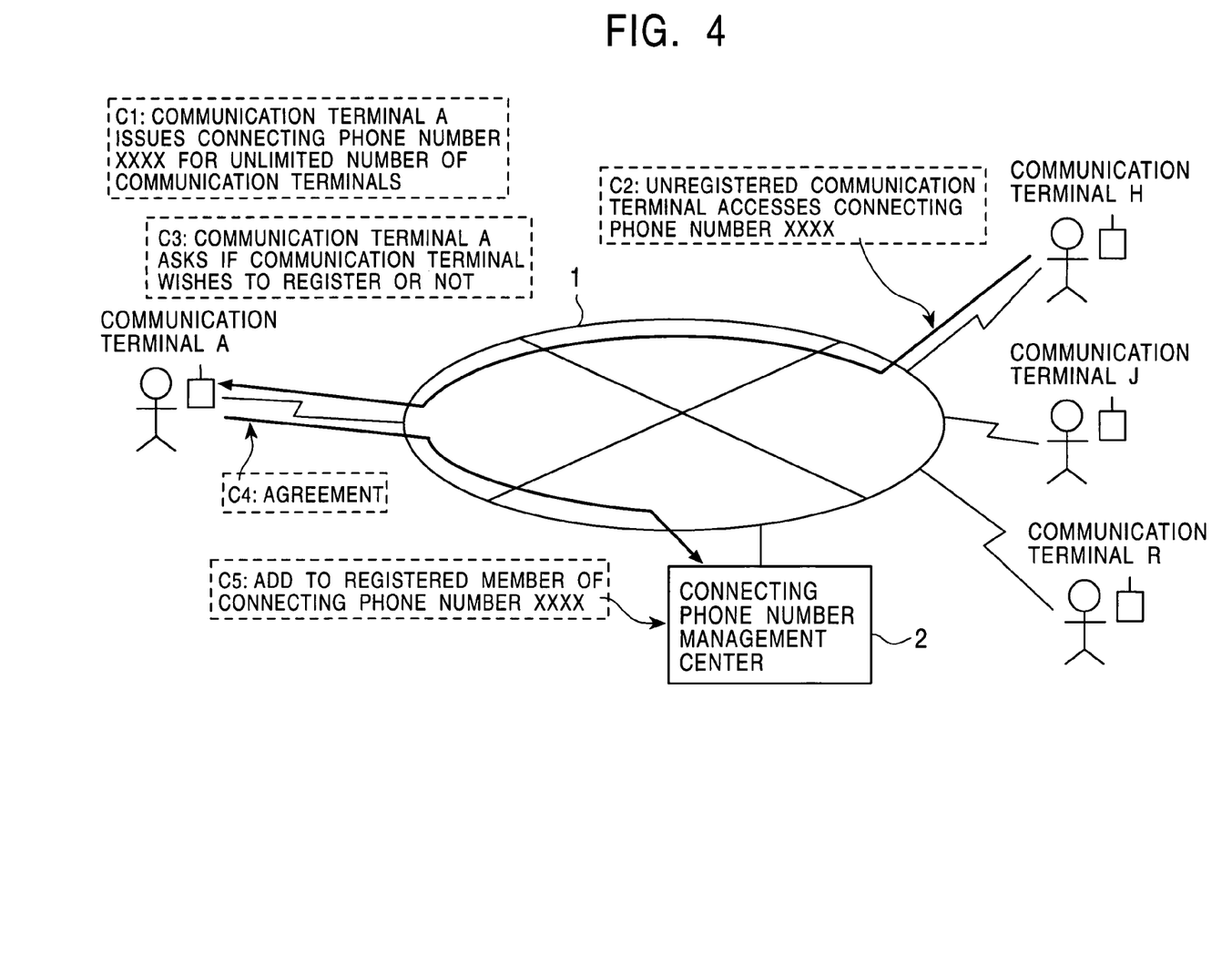
FIG. 4 is a block diagram showing a configuration of a communication system and a mechanism of registering members according to a second embodiment of the present invention.

FIG. 4 is a block diagram showing a configuration of a communication system and a mechanism of registering members according to a second embodiment of the present invention.

The configuration of the network side of the communication system of the present embodiment is the same as that of the communication system of the first embodiment.

However, in the communication system of the present embodiment, an unspecified number of communication terminals (in this case, communication terminals H, J, R), which do not surely plan to be registered as members at the beginning, are included as the communication terminals (except the communication terminal A) connected to the network 1 including a Public Switched Network in a category.

In FIG. 4, only the three communication terminals H, J, R are illustrated as the communication terminals other than the communication terminal A. However, according to the present embodiment, the number of candidate communication terminals to be registered as members in accordance with the issuance of the connecting phone number is not limited generally.

An operation of registering members in the communication system according to the present embodiment will now be described.

First, at step C1, a contractant (communication terminal A) contracts in a condition of unlimited number of registrants and issue a connecting phone number XXXX. More specifically, the contractant (the communication terminal A) sends only the connecting phone number XXXX to the connecting phone number management center 2.

At Step C2, a user (unregistered user) who wishes to register as a member accesses the connecting phone number XXXX using the communication terminal H of his/her own.

At Step C3, the contractant communication terminal A being a management terminal determines whether or not the accessing communication terminal H is to be registered.

If the communication terminal A agrees to the registration of the accessing communication terminal H at Step C4, the connecting phone number 2 officially issues the connecting phone number XXXX to the accessing communication terminal H at Step C5.

According to the above-described method of registering members, it is possible to add unlimited number of members so that not only one small community but also a large communication world can be generated.

According to the method, a charging system can be a fixed price system in which a fixed price is set per person and this is a preferable charging system.

Figure 5:
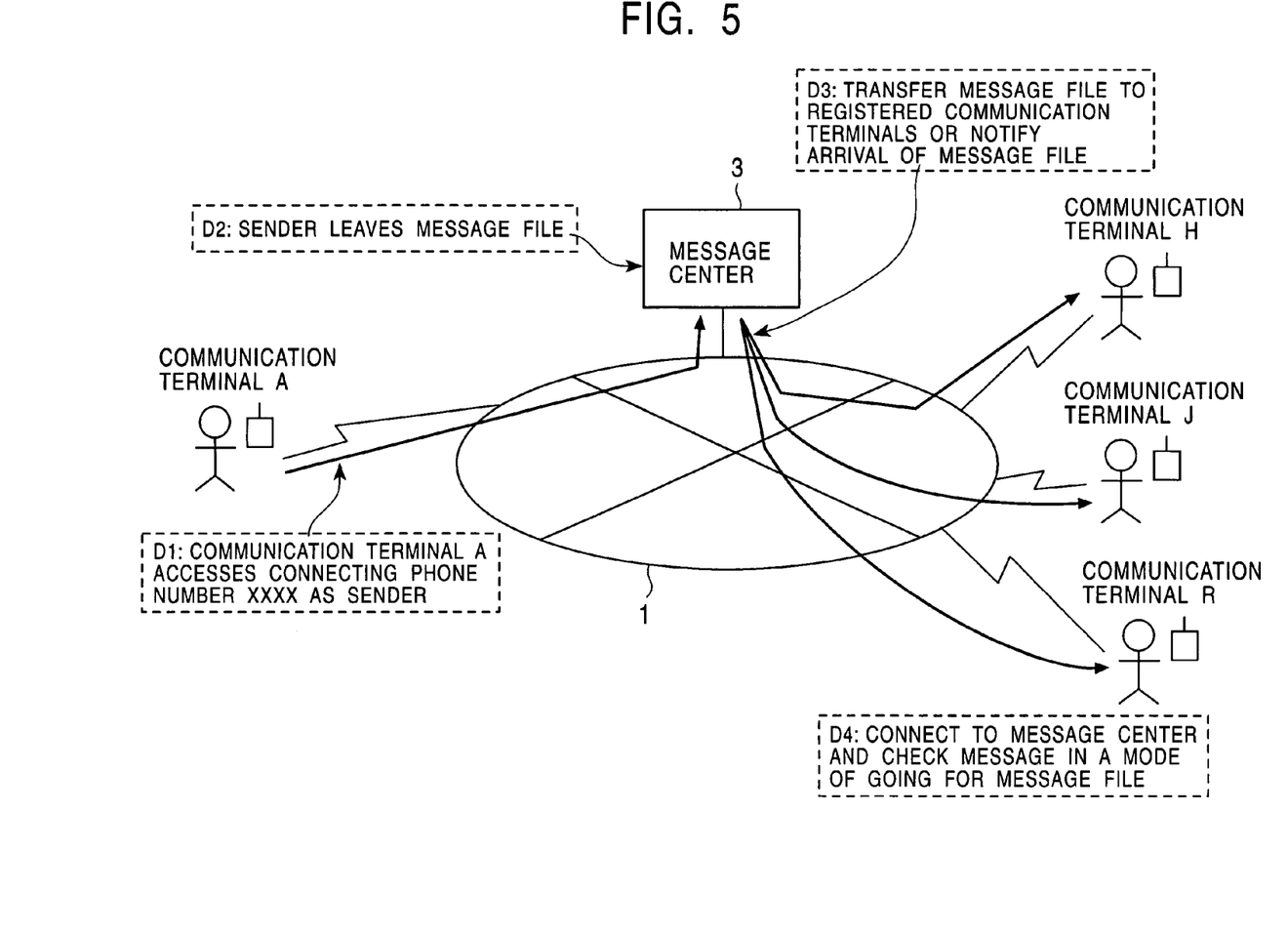
FIG. 5 is a block diagram showing a mechanism of message transfer in the communication system according to the second embodiment of the present invention.

FIG. 5 is a block diagram showing a mechanism of a message transfer in the communication system according to the second embodiment of the present invention.

FIG. 5 shows a case where the user of the communication terminal A being the management terminal transfers a message file to all members of the specific community.

An operation of the message transfer in the communication system according to the present embodiment will now be described.

First, at Step D1, the user of the communication terminal A being the management terminal tries to access the issued connecting phone number XXXX as a sender. The message center 3 attached to the network 1 confirms that the communication terminal A is a registered member of the connecting phone number XXXX so as to allow the communication terminal A to access the connecting phone number XXXX. After the access is allowed, the user of the communication terminal A selects either one of a first mode in which a message file to be transferred is directly sent to the other members and a second mode in which a registered member accesses to the message center 3 to receive the message file to be transferred. Next, the communication terminal A sends a message file consisting of voice information, character information, image information and the like.

At step D2, the message file sent to the message center 3 is stored in a memory on the message center 3.

At step D3, in a case where the communication terminal A selects the first mode in which the message file to be transferred is directly sent to the other members, the message center 3 directly sends the message file to the communication terminals registered to the connecting phone number XXXX other than the communication terminal being the sender (in this case, the communication terminal A). On another case where the communication terminal A selects the second mode in which the other member accesses the message center 3, the message center 3 sends only a notice that the message file has arrived to the communication terminals registered to the connecting phone number XXXX other than the communication terminal being the sender (in this case, the communication terminal A).

At step D4, when a member registered to the connecting phone number XXXX receives the notice and accesses the message center 3 at an arbitrary point of time, the registered member can read or hear the message file from the communication terminal A.

According to the message transfer method shown in FIG. 5, it is possible to send a message file from a specific sender to a plurality of members at a time. Furthermore, among the registered members, it is possible to communicate with a registered member using the above-described message transfer method, even if a sender does not know a phone number of the registered member.

In addition, it is possible to prevent leakage of individual phone numbers since only the connecting phone number remains in the memory of the communication terminals in the message center 3.

Figure 6:
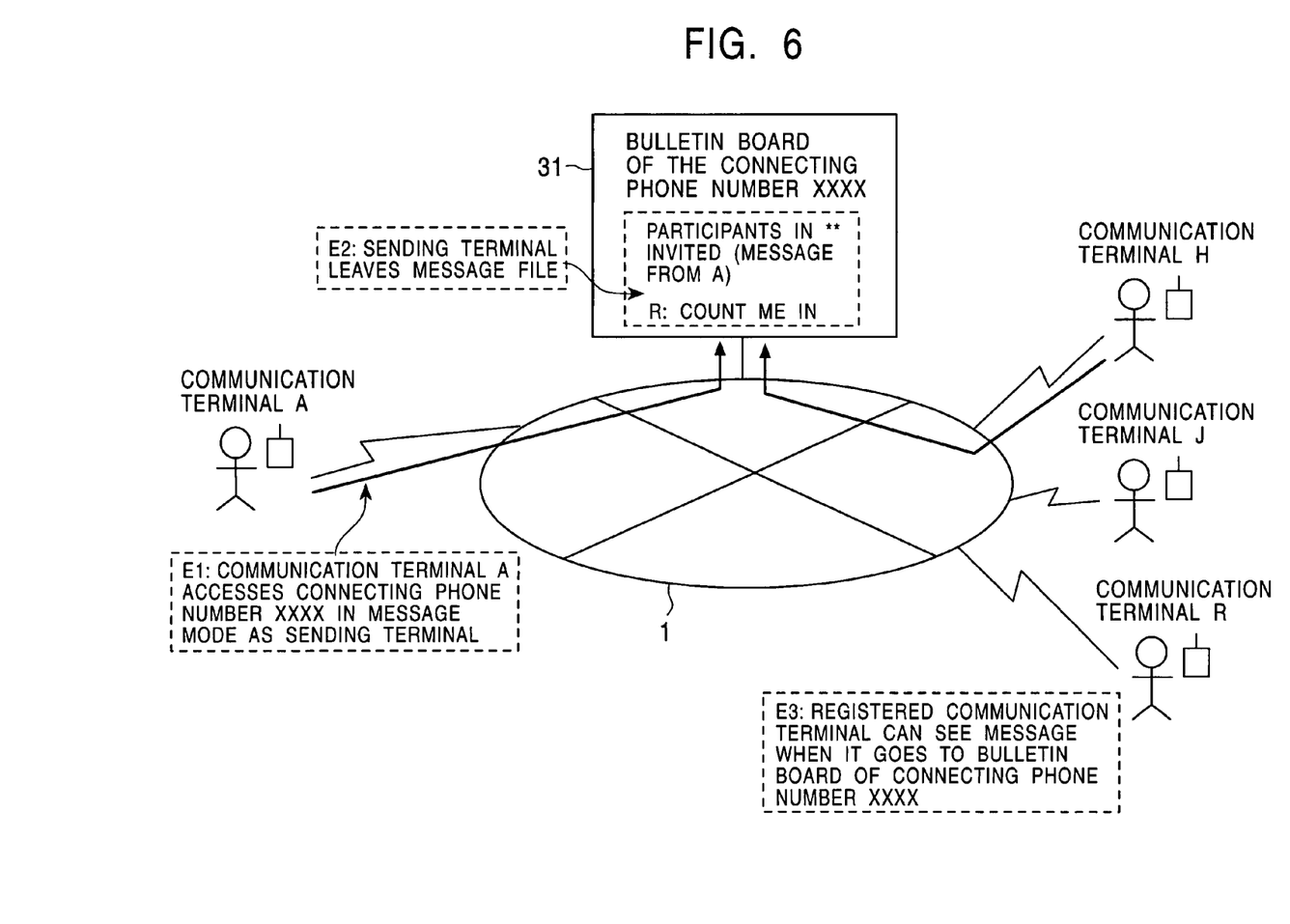
FIG. 6 is a block diagram showing a mechanism of a bulletin board function of the communication system according to the second embodiment of the present invention.

FIG. 6 is a block diagram showing a mechanism of a bulletin board function of the communication system according to the second embodiment of the present invention.

FIG. 6 shows a case where a message from the user of the communication terminal A being the management terminal to all members of the specific community is stored in a bulletin board 31 for the connecting phone number XXXX in the message center 3.

An operation for realizing the bulletin board function of the communication system of the present embodiment will now be described.

First, at Step E1, the communication terminal A which is registered to the connecting phone number XXXX accesses to the connecting phone number XXXX in a message mode. A connecting phone number management center 2 attached to the network 1 allows the communication terminal A to access the connecting phone number XXXX since the communication terminal A is a registered communication terminal registered to the connecting phone number XXXX. Next, the communication terminal A leaves a message consisting of voice information, character information, image information and the like. Accordingly, at Step E2, the message is stored on the bulletin board 31 for the connecting phone number XXXX, and the message center 3 notifies the communication terminal registered to the connecting phone number XXXX except for the sender (in this case, the communication terminal A) that a new message is now on the bulletin board 31 for the connecting phone number XXXX.

At Step E3, when a user of a communication terminal registered to the connecting phone number XXXX receives the notice and accesses to the bulletin board 31 of the connecting phone number XXXX, the user of the registered communication terminal can read or hear the message file from the communication terminal A.

As another method for accessing the bulletin board 31 of the connecting phone number XXXX, it is also possible to select a mode in which the message is taken out from the bulletin board 31 after the communication terminal connects to the connecting phone number XXXX.

According to the method illustrated in FIG. 6, all members can have a look at the logs among the members already registered to date at a time. Accordingly, there is no need to remember the other members' phone numbers and call one another among the registered members. In addition, since no one but the users of the registered communication terminals can access the connecting phone number XXXX, security for the message on the bulletin board is guaranteed.

Similar to the function shown in FIG. 5, every member can communicate with the other members independent from the phone number peculiar to each member.

In addition, since a telephone number of a new registrant will not be notified to the other members but only to the contractant (the user of the communication terminal A), it is efficiently useful when one would like to communicate with the others without giving his/her own phone number.

Furthermore, a user who possesses a plurality of communication terminals can have an advantage to reduce bothersome management of the phone numbers of the plurality of communication terminals.

(Characteristic Features Common in the First and Second Embodiments)

Figure 7:
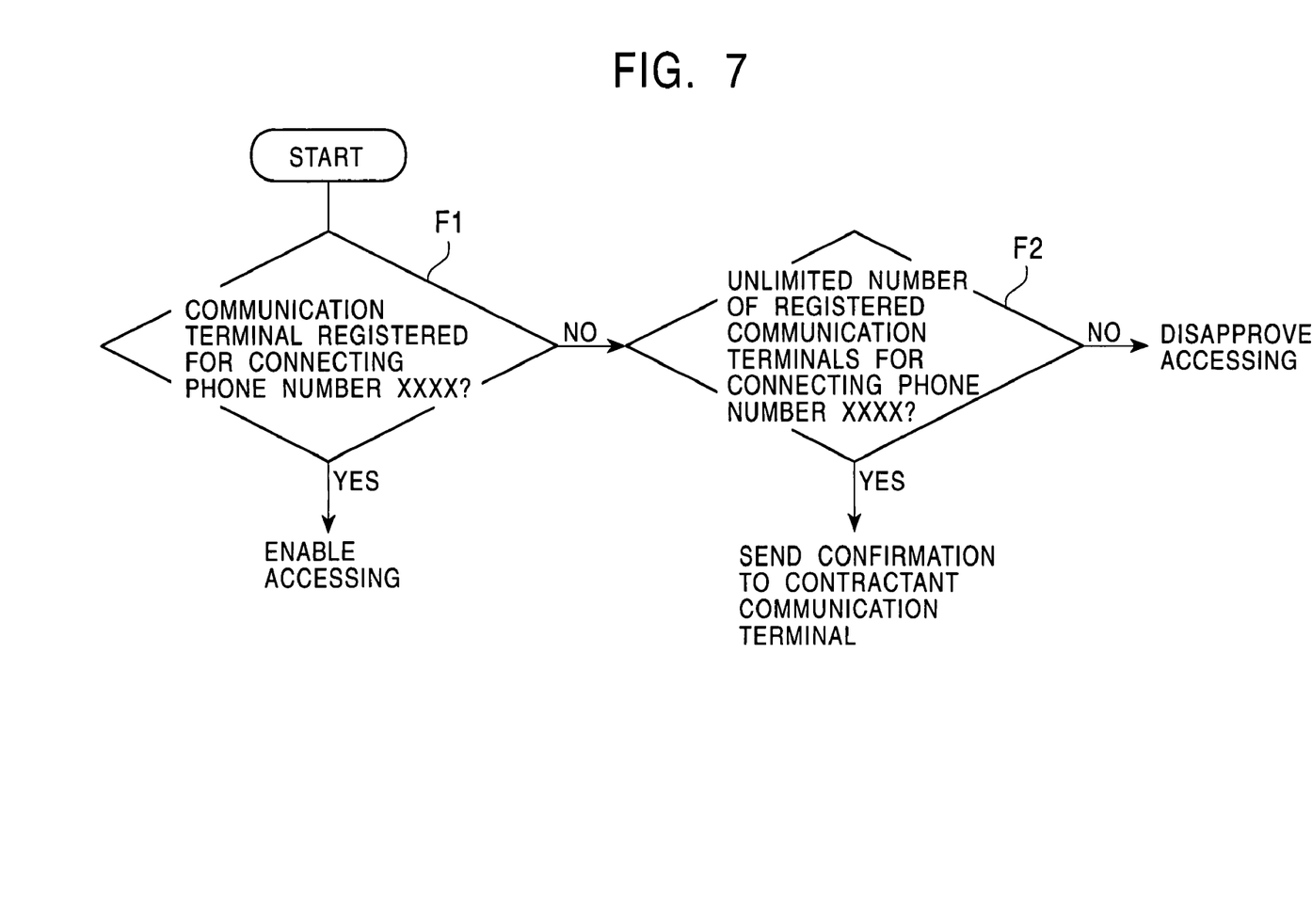
FIG. 7 is a flowchart showing an operation of exchange processing on a network of the communication systems according to the first and second embodiments of the present invention.

FIG. 7 is a flow chart showing an exchange operation on the network 1 in the communication system according to the first and the second embodiments of the present invention.

When the connecting phone number XXXX is accessed by a communication terminal on the network 1, at Step F1, the connecting phone number management center 2 determines whether or not the accessing communication terminal is a communication terminal registered in correspondence to the connecting phone number XXXX, and in a case where the accessing communication terminal is a registered one, it is allowed to access the connecting phone number XXXX. On the other hand, in a case where the accessing communication terminal is not the registered one, the process goes to the below-described Step F2.

At Step F2, the connecting phone number management center 2 determines whether or not the connecting phone number XXXX is a connecting phone number which is allowed to have an unlimited number of communication terminals to be registered thereto. In a case where the connecting phone number XXXX is allowed to have an unlimited number of communication terminals registered thereto, the connecting phone number management center 2 sends a confirmation to the contractant (the management terminal of the community). In a case where the connecting phone number XXXX is not the one which is allowed to have an unlimited number of communication terminals to be registered thereto, the accessing communication terminal is refused to access the connecting phone number XXXX.

In the above description, the case where an ordinary communication terminal accesses the connecting phone number XXXX has been described. The same operation is applicable to a case where the message center 3 or the bulletin board 31 of the connecting phone number XXXX accesses the connecting phone number XXXX.

In addition, it is also possible to combine the connecting phone number management center 2 and the message center 3, which are described in each of the above-described embodiments.

Furthermore, it is also possible to incorporate the bulletin board 31 of the connecting phone number XXXX into the message center 3.

As described above, according to the present invention, members to whom a connecting phone number is issued is registered in a network, and a connecting phone number management center for managing the registered members, a message center which keeps communication data between members and sends the communication data to the other members, and a bulletin board for posting messages of the members are provided. Accordingly, it is not always necessary to know the phone numbers of the communication terminals of all registered members and it is possible to use the connecting phone number which is common in the community.

In addition, with a single access to the connecting phone number, a message file or a message can be sent or notified to all the members so that the labor and time required for the communication is dramatically reduced.

Furthermore, one can send a message file to the other members and can take in a message file addressed to him/her at any time he/she likes.

It is also possible to set or change a charge rate for the connecting phone number at the time of or after of contract.

Additionally, there is no need for a new capital investment or a contract with an Internet provider, as in the case of using the Internet.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A communication system in which a plurality of communication terminals, which are connected to a network including a Public Switched Network in a category thereof, mutually communicate through communication data addressed to a common phone number issued by a communication terminal being a management terminal, comprising:
   a phone number management unit, a message management unit and a bulletin board unit provided in said network,
   means for registering a predetermined communication terminal so as to correspond to said issued common phone number by sending an identification name of the predetermined communication terminals of said plurality of communication terminals to said phone number management unit in correspondence with said common phone number issued from said management terminal;
   means for sending a message file from a registered communication terminal using said common phone number to other registered communication terminals via the message management unit when a first mode, in which the message file is to be directly sent to the other communication terminals, is selected, and leaving the message file in said message management unit and notifying the other registered communication terminals of arrival of the message file when a second mode in which any registered communication terminal accesses to said message management unit to receive the message file is selected;
   means for leaving a message sent by accessing from a registered communication terminal to said common phone number on said bulletin board unit; and
   means for reading at any time the message file left in said message management unit, in a case where the message file is left in said message management unit, and the message left on said bulletin board unit, in a case where the message is left on the bulletin board unit, from an arbitrary one of the other registered communication terminals.

2. The communication system according to claim 1, wherein each of said communication terminals has an identification name which is any one of a telephone number, an E-mail address and an identification number assigned to each of said communication terminal and an identification number assigned to a medium in a case where the communication terminal is capable of using the medium.

3. The communication system according to claim 1, wherein said message file and said message contain one or more information mode selected from voice information, character information and image information, respectively.

4. A communication system in which a plurality of communication terminals, which are connected to a network including a Public Switched Network in a category thereof, mutually communicate through communication data addressed to a common phone number issued by a communication terminal being a management terminal, comprising:
   a phone number management unit, a message management unit and a bulletin board unit provided in said network;
   means for registering, after being accessed by an arbitrary one of said plurality of communication terminals using said issued common phone number and receiving a confirmation by said management terminal, the arbitrary one of said communication terminals in correspondence with said common phone number issued from said management terminal;
   means for sending a message file sent by accessing from a registered communication terminal to said common phone number to other registered communication terminals via the message management unit when a first mode in which the message file to be directly sent to the other communication terminals is selected, and leaving the message file in said message management unit when a second mode in which any registered communication terminal accesses to said message management unit to receive the message file is selected;

means for leaving a message sent by accessing from a registered communication terminals to said common phone number on said bulletin board unit; and means for reading at any time the message file left in said message management unit, in a case where the message file is left in said message management unit, and the message left on said bulletin board unit, in a case where the message is left on said bulletin board unit, from an arbitrary one of the other registered communication terminals.

5. The communication system according to claim 4, wherein each of said communication terminals has an identification name which is any one of a telephone number, an E-mail address and an identification number assigned to each of said communication terminal and an identification number assigned to a medium in a case where the communication terminal is capable of using the medium.

6. The communication system according to claim 4, wherein said message file and said message contain one or more information mode selected from voice information, character information and image information, respectively.

7. A communication method in which a plurality of communication terminals, which are connected to a network including a Public Switched Network in a category thereof, mutually communicate through communication data addressed to a common phone number issued by a communication terminal being a management terminal, wherein:

said network is provided with a phone number management unit, a message management unit and a bulletin board unit, and said method comprising the steps of:

registering a predetermined communication terminal so as to correspond to said issued common phone number by sending an identification name of the predetermined communication terminal of said plurality of communication terminals to said phone number management unit in correspondence with said common phone number issued from said management terminal;

sending a message file sent by accessing from a registered communication terminal to said common phone number to other registered communication terminals via the message management unit when a first mode in which the message file to be directly sent to the other communication terminals is selected, and leaving the message file in said message management unit and notifying the other registered communication terminals of arrival of the message file when a second mode in which any registered communication terminal accesses to said message management unit to receive the message file is selected;

leaving a message sent by accessing from a registered communication terminal to the common phone number on said bulletin board unit; and reading at any time the message file left in said message management unit or the message left on said bulletin board unit from an arbitrary one of the registered communication terminals.

8. The communication method according to claim 7, wherein each of said communication terminals has an identification name which is any one of a telephone number, an E-mail address and an identification number assigned to each of said communication terminal and an identification number assigned to a medium in a case where the communication terminal is capable of using the medium.

9. The communication method according to claim 7, wherein said message file and said message contain one or more information mode selected from voice information, character information and image information, respectively.

10. A communication method in which a plurality of communication terminals, which are connected to a network including a Public Switched Network in a category thereof, mutually communicate through communication data addressed to a common phone number issued by a communication terminal being a management terminal, wherein:

said network is provided with a phone number management unit, a message management unit and a bulletin board unit, and said method comprising the steps of:

registering, after being accessed by an arbitrary one of said plurality of communication terminals using said issued common phone number and receiving a confirmation by said management terminal, the arbitrary one of said communication terminals in correspondence with said common phone number issued from said management terminal;

sending a message file sent by accessing from a registered communication terminal to said common phone number to other registered communication terminals via the message management unit when a first mode in which the message file to be directly sent to the other communication terminals is selected, and leaving the message file in said message management unit when a second mode in which any registered communication terminal accesses to said message management unit to receive the message file is selected;

leaving a message sent by accessing from a registered communication terminal to said common phone number on said bulletin board unit; and reading at any time the message file left in said message management unit, in a case where the message file is left in said message management unit and the message left on said bulletin board unit, in a case where the message is left on said bulletin board unit, from an arbitrary one of the other registered communication terminals.

11. The communication method according to claim 10, wherein each of said communication terminals has an identification name which is any one of a telephone number, an E-mail address and an identification number assigned to each of said communication terminal and an identification number assigned to a medium in a case where the communication terminal is capable of using the medium.

12. The communication method according to claim 10, wherein said message file and said message contain one or more information mode selected from voice information, character information and image information, respectively.

* * * * *